United States Patent

[11] 3,565,089

[72] Inventor William S. Thompson
Elkhart, Ind.
[21] Appl. No. 792,547
[22] Filed Jan. 21, 1969
[45] Patented Feb. 23, 1971
[73] Assignee Elkhart Brass Manufacturing Company, Inc.
Elkhart, Ind.

[54] VALVE
10 Claims, 4 Drawing Figs.
[52] U.S. Cl. .................................. 137/68,
137/556, 251/285
[51] Int. Cl. .................................. F16k 13/04;
[50] Field of Search.......................... 137/68,
553, 556, 556.3; 251/285, 287, 288

[56] References Cited
UNITED STATES PATENTS
762,260 6/1904 Stone ........................... 251/288
3,253,612 5/1966 Curatola et al. ............... 137/553
3,361,148 1/1968 Turek........................... 137/68

Primary Examiner—Henry T. Klinksiek
Attorney—Oltsch & Knoblock

ABSTRACT: A valve having body and bonnet and including a stem shiftable longitudinally in the bonnet. A valve member is mounted to the inner end of the stem and cooperates with a valve seat in the valve body to control the flow rate through the valve. A hand grip is mounted on the outer end of the stem. A stop member is attached to the stem between the hand grip and bonnet and includes a part which is adjustable relative to and shiftable with the stem and a part which is engageable with a stationary projection carried by the valve to limit valve opening movement of the stem.

PATENTED FEB 23 1971　　　　　　　　　　　　　　　　　3,565,089

INVENTOR.
WILLIAM S. THOMPSON
BY Oltsch & Knoblock
ATTORNEYS

VALVE

BACKGROUND OF THE INVENTION

This invention relates to a fluid valve and concerns a device which is attachable to the valve and which limits the extent to which the valve can be opened.

In order to provide fire protection, many structures, such as office, school and apartment buildings, have water connected fire hose selectively located throughout. These fire hose are intended for the use of the occupants of the structure and of firemen. It has been found that as long as the rate of flow of water discharged through the hose is maintained within predetermined limits, a person who has no professional firefighting experience can make effective use of the hose during a fire. When the hose is being utilized by firemen or other experienced fire fighters, it has been found that more effective use can be made of the hose when the rate of flow of water is increased. In order to accommodate both the experienced and the inexperienced fire fighter, various means are used which normally limit or restrict the flow of water or other fluid discharged through the hose but which may be rendered inoperative when an increase in the rate of flow is desired.

One such means of limiting the rate of flow of fluid issuing from a fire hose is illustrated and described in U.S. Pat. No. 3,361,148. In this patent the globe valve which connects the hose to a water source has a breakable member which is mounted on the valve hand wheel and which, when the valve stem is turned to open the valve, is adapted to engage a ring adjustably mounted upon the valve bonnet. This valve, although serving its intended purpose, has the disadvantage of requiring the use of a specially constructed hand wheel and bonnet which substantially adds to the cost of the valve. The valve of my invention eliminates this disadvantage.

SUMMARY OF THE INVENTION

This invention concerns a fluid valve having a body and connected bonnet. The body includes a valve seat and has an inlet and an outlet. An axially shiftable stem is received by the bonnet and includes an inner end having a valve member attached thereto which cooperates with the valve seat to define the rate of fluid flow through the valve and an outer end having a hand or other grip mounted thereon. A stop means is attached to the stem between the hand grip and the bonnet and includes a part positioned adjacent the bonnet and shiftable with the stem and a part which is engageable with a stationary stop carried by the valve to limit movement of the valve member relative to the valve seat.

A standard valve, such as a globe valve, can be converted into a restricting valve with only slight modification. The stop means is clamped or otherwise secured to the valve stem. The packing or stuffing nut threaded on the upper portion of the valve bonnet through which the stem projects is preferably removed and replaced by a nut having an outwardly projecting peripheral lip. The stop means is adapted to engage the lip when the stem is longitudinally shifted a selected distance to open the valve a predetermined extent. The attachment of the stop means to the valve stem and the exchange of packing nuts can be accomplished through the use of simple hand tools and requires only a minimum of effort. A minimum number of specially designed parts is required, and valves in current use can be quickly and inexpensively converted into restricting valves.

Accordingly, it is an object of this invention to provide a fluid valve having stop means which permit the valve to be opened only a selected amount and which can be rendered inoperative when a user desires to open the valve fully.

It is another object of this invention to provide simple means attachable by the use of simple hand tools to a standard valve and which permits the valve to be opened a selected amount but which can be quickly rendered inoperative when a user desires to open the valve fully.

Other objects of this invention will become apparent upon a reading of the invention's description.

DESCRIPTION OF THE PREFERRED EMBODIMENT

Figure 1:
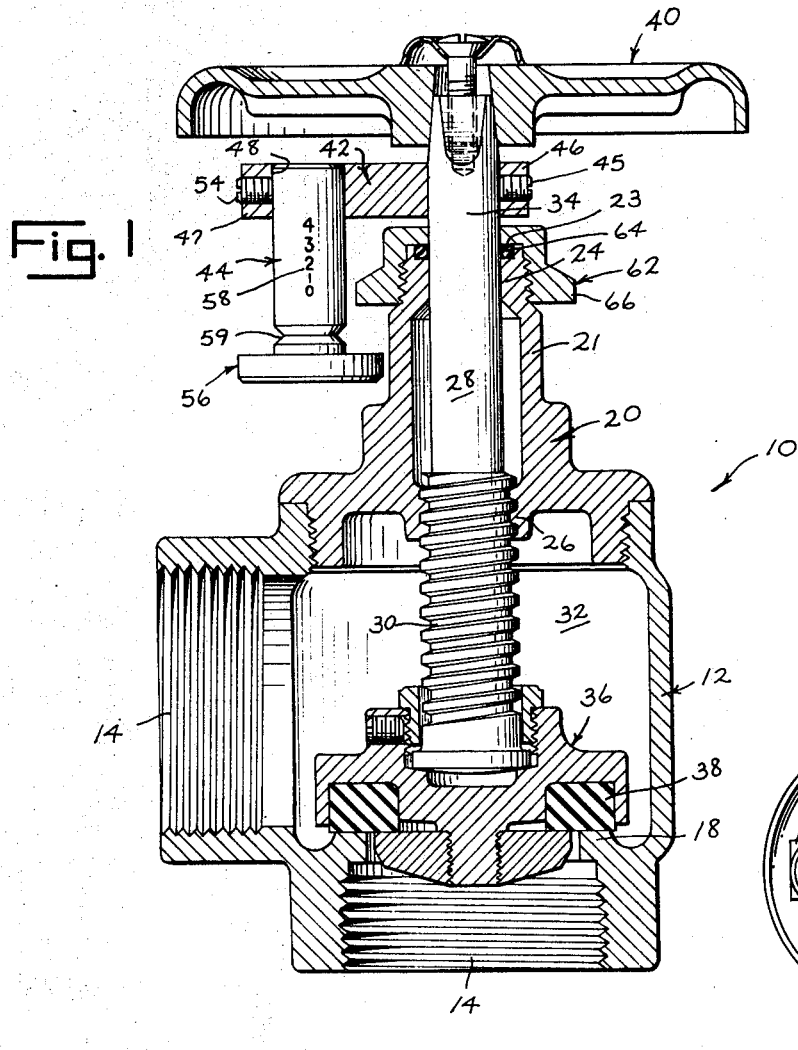
FIG. 1 is an axial sectional view of the preferred embodiment of the valve of this invention in a closed position.
Figure 3:
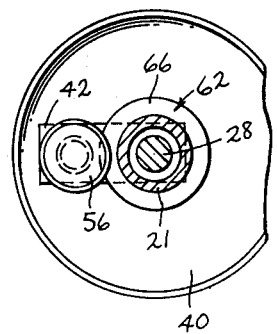
FIG. 3 is a sectional view taken along line 3—3 of FIG. 2.

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

The invention is here illustrated as applied to a valve 10 which includes a housing having body 12 and a bonnet 20. Body 12 is preferably formed of a cast metal, such as bronze, and includes inlet and outlet passages 14 and a valve seat 18. Bonnet 20 is preferably of separate construction and has threaded connection with body 12. Bonnet 20 includes a protruding part 21 which is axially aligned with the inlet passage and valve seat 18 and which has a restricted threaded inner end part 26 and a restricted outer end part 24. A stem 28 extends through bonnet 20 and includes an inner end part 30 which is preferably threaded in part 26 of the bonnet and which projects into cavity 32 in valve body 12. The outer end part 34 of the stem extends with slight clearance through part 24 of the bonnet and projects outwardly therefrom. The part 24 of the bonnet has an outer end face 23 configured to define an annular seat supporting an annular seal, such as an O-ring 64. Seal 64 constrictively encircles stem 28 and is retained by a packing nut 62 which encircles the stem and is threaded onto bonnet part 24.

A valve member 36 is secured to the inner end part 30 of stem 28, preferably as illustrated in FIG. 1, and includes an annular seal ring 38 which is adapted in one position thereof to engage and coact with valve seat 18 to provide a seal between the valve seat 18 and the valve member 36. A hand grip, such as hand wheel 40, is removably secured to the outer end part 34 of stem 28, preferably as illustrated in FIG. 1, and serves, when turned, to rotate stem 28 and thereby cause valve closure member 36 to be shifted toward or from the valve seat 18. The structure thus far described is a standard valve known generally as a globe valve.

Figure 4:
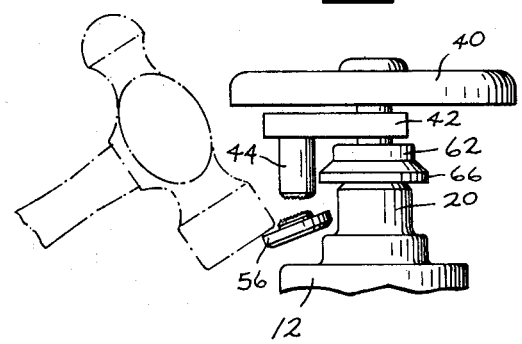
FIG. 4 is a fragmentary side view of the valve of FIG. 2 showing a portion of the valve being removed therefrom to permit the valve to be fully opened.

A stop means which includes a support member 42, an adjustable part 44, and an abutment part 56 is attached to valve stem 28. Support member 42 preferably has an apertured end part 46 which fits around the outer end part 34 of stem 28 and which is positioned between and preferably spaced from hand wheel 40 and nut 62. Support member 42 is preferably affixed to stem 28 by means of a set screw 45 threaded therein. Support member 42 projects laterally outwardly relative to stem 28 and nut 62 and has an aperture 48 formed in its outer part which has an axis which is substantially parallel to the axis of the stem and which is spaced from stem 28 a distance greater than the outer dimension of nut 62. Part 44 of the stop means preferably constitutes a stud which is adjustably received within aperture 48 of support member 42 and is anchored therein by means of a set screw 54 threaded into end part 47 of the support member. An abutment part 56, such as a flange member, is carried by and may be formed integral with adjustable part 44 at its lower end, being positioned below the nut 62 and partially underlapping said nut. A circumferential groove or notch 59 is preferably formed in part 44 adjacent and above abutment part 56. Part 44 is preferably formed of a relatively brittle or frangible material, such as cast iron, which can be fractured when struck with a hammer or other tool, as illustrated in FIG. 4, to separate abutment part 56 from part 44, preferably at notch 59.

Figure 2:
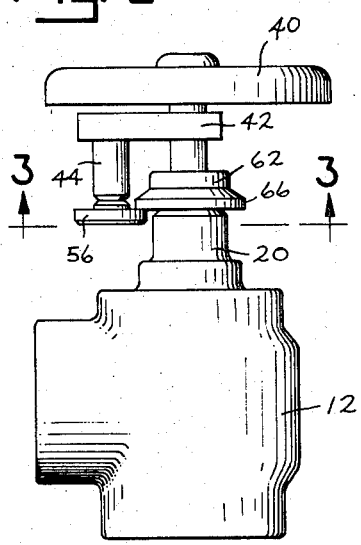
FIG. 2 is a side view of the valve of FIG. 1 in open position.

A stationary stop or abutment 66, forms a part of valve 10 and is preferably an outwardly projecting peripheral lip which forms an integral part of packing nut 62. Stop 66 projects into the path of movement of abutment part 56 and is engageable thereby, as illustrated in FIG. 2, when the stem 28 has been rotated a predetermined amount to open the valve. It is to be understood that, while it is preferable to utilize a packing nut having a peripheral lip which is engageable with abutment part 56, it is within the intended scope of this invention to have the stop 66 cast with or attached directly to the bonnet or valve body.

With support member 42 clamped or affixed to stem 28, part 44 can be adjusted relative to the support member by loosening set screw 54 and longitudinally shifting part 44 within support member aperture 48, thereby varying the spacing between abutment part 56 and the stop to adjust the travel of the valve member 36 between closed and restricted open positions. Part 44 preferably has longitudinally spaced indicia 58 formed thereon which is preferably progressively numbered and correlated to the flow rate permitted through the valve at different adjustments. If unrestricted valve operation is desired, as when the valve connects a fire hose to a water source and the hose it to be utilized by experienced firemen, the abutment part 56 may be struck by a hammer or other tool to separate the abutment part from part 44 and free the valve stem for maximum flow capacity.

I claim:

1. In a fluid valve comprising a housing having an inlet, an outlet and a valve seat, a stem shiftably carried by said housing and including an inner part which projects into said body housing and which mounts a valve member and an axially shiftable outer projecting part which mounts a grip, said valve member cooperating with said valve seat to regulate fluid flow through said valve outlet as said outer stem part is axially shifted, the improvement comprising stop means attached to said outer stem part between said grip and said housing and including an abutment shiftable with said outer stem part, and a stationary stop carried by the housing and positioned between said grip and said abutment and projecting into the path of movement of said abutment to limit the extent to which said valve may be opened, said abutment being movable relative to said outer stem part and said stationary stop to vary the spacing between said stationary stop and abutment along the path of movement of said abutment.

2. The valve of claim 1 wherein said stop means includes a reduced cross-sectional frangible part adjacent said abutment.

3. The valve of claim 1 wherein said housing includes a packing nut encircling said stem, said stop forming a part of said packing nut.

4. A device for limiting the opening of a fluid valve including a housing having a valve seat therein, a stem threaded in said housing and axially shiftable upon rotation, grip means mounted on the outer end of said stem and a valve member mounted on the inner end of said stem and cooperable with said valve seat to regulate fluid flow through said valve comprising stop means attachable to said stem in selected position between said grip means and said housing and including a part positionable in an offset lateral relationship from said stem and carrying an abutment shiftable with said stem, a stationary stop adapted to be carried by the housing and positionable so as to project into the path of movement of said abutment and be contacted thereby when said stem is rotated to open said valve to a selected extent, said abutment being movable relative to said stem and stationary stop to vary the spacing between said abutment and stationary stop along the path of movement of said abutment.

5. The device of claim 4, and including a packing nut adapted to encircle said stem and threadably engaged said housing, said packing nut constituting the stationary stop engageable by said abutment.

6. The device of claim 4 wherein said stop means includes a support part adapted for attachment to said stem between said grip means and said housing and having a releasable clamp means spaced from said stem, said first mentioned part including a stud adjustably anchored by said clamp means said abutment including a flange member mounted adjacent one end of said stud and engageable with said stationary stop.

7. The valve of claim 6 wherein said stud includes a reduced cross-sectional part adjacent said flange member.

8. In a fluid valve comprising a housing having an inlet, an outlet and a valve seat, a stem shiftably carried by said housing and including an inner part which projects into said housing and which mounts a valve member and an axially shiftable outer projecting part which mounts a grip means, said valve member cooperating with said valve seat to regulate fluid flow through said valve outlet as said outer stem part is axially shifted, the improvement comprising stop means attached to said outer stem part between said grip means and said housing, said stop means including a support part secured to said outer stem part and defining a releasable clamp means, said stop means further including a stud adjustably anchored by said clamp means, said stud carrying a flange member, and a stationary stop carried by said housing and positioned between said grip.

9. The valve of claim 8 wherein said stud has indicia thereon visible when said stud is anchored by said clamp means and indicating the flow rate through said valve when said flange member engages said stop. means and said flange member and projecting into the path of movement of said flange member for engagement with said flange member to limit the extent to which said valve may be opened.

10. A device for limiting the opening of a fluid valve including a housing having a valve seat therein, a stem threaded in said housing and axially shiftable upon rotation, grip means mounted on the outer end of said stem and a valve member mounted on the inner end of said stem and cooperable with said valve seat to regulate fluid flow through said valve comprising stop means, said stop means including a support part adapted for attachment to said stem in selected position between said grip means and said housing and having a releasable clamp means laterally spaced from said stem, said stop means further including a stud adjustably anchored by said clamp means and a flange member carried by said stud, a stationary stop adapted to be carried by the housing and positionable so as to project into the path of movement of said flange member and be contacted thereby when said stem is rotated to open said valve to a selected extent, said stud having indicia thereon visible when said stud is anchored by said clamp means to indicate the flow rate through said valve outlet when said flange member contacts said stationary stop.